A. R. KEELER.
HARROW EVENER.
APPLICATION FILED JULY 31, 1914.
1,159,043.
Patented Nov. 2, 1915.
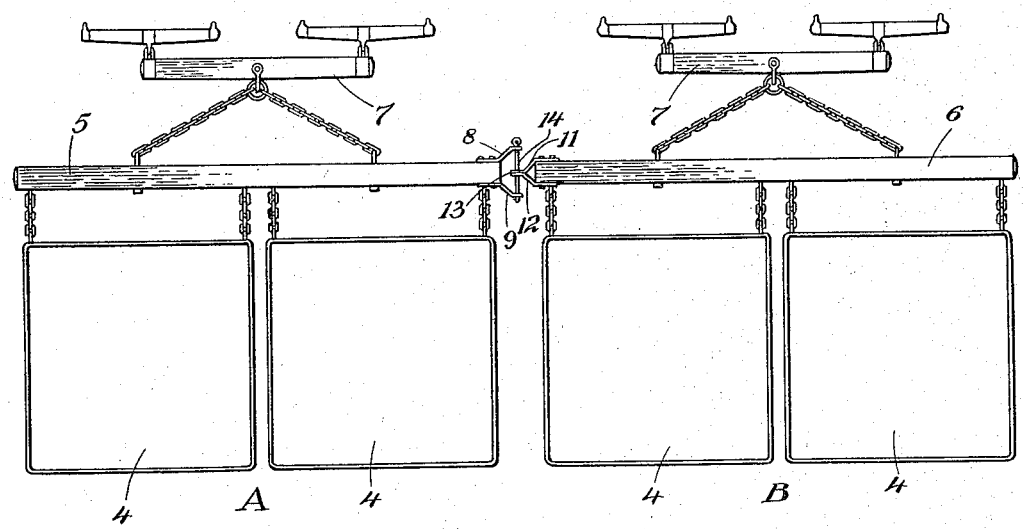
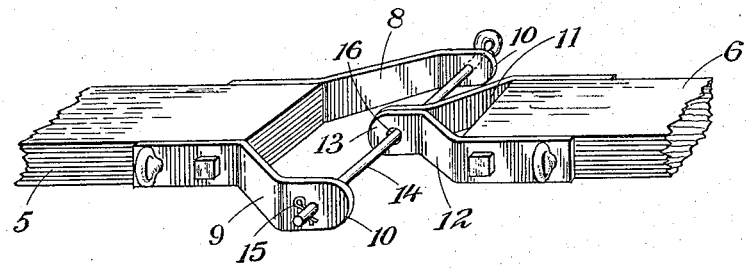
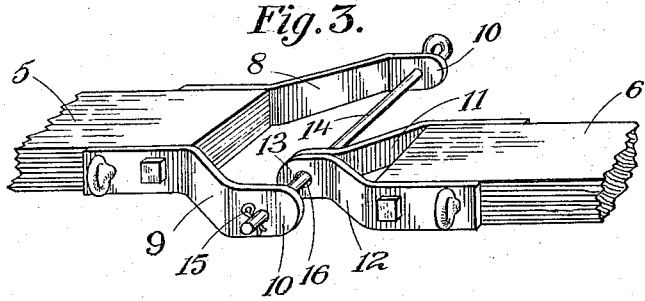
Witnesses:
Phil J. Nawn
Thomas A. Baumm Jr.
Inventor:
A. R. Keeler
By Baumm & Baumm
Atty's

UNITED STATES PATENT OFFICE.

ALONZO R. KEELER, OF ALTONA, ILLINOIS.

HARROW-EVENER.

1,159,043.

Specification of Letters Patent.

Patented Nov. 2, 1915.

Application filed July 31, 1914. Serial No. 854,401.

*To all whom it may concern:*

Be it known that I, ALONZO R. KEELER, a citizen of the United States, residing at Altona, in the county of Knox and State of Illinois, have invented certain new and useful Improvements in Harrow-Eveners, of which the following is a specification.

The present invention has reference to certain improvements in agricultural implements which are generally known as harrow eveners. These implements are used chiefly for the purpose of breaking up the clods of soil and leveling or evening the ground so as to bring the cultivated field into a finished condition.

The harrows are made in various forms and styles but ordinarily each harrow section comprises a rectangular frame within which are supported teeth or other clod-breaking and evening devices. It is impractical to construct and use a harrow section of very large size, largely for the reason that it will not properly follow the changes in contour of the different portions of the field if so constructed. It is therefore customary to attach two or more harrow frame sections to a draw-bar so that each frame section will be free to rise and fall independently of the others. As a rule, two of these sections thus attached to a common draw-bar can be properly operated by a team of horses, but in case more than two sections are attached to the same bar additional horse-power is necessary. Where it is desired to even over a greater width of track than that covered by two harrow frame sections, some arrangement must be adopted whereby a larger number of frame sections can be simultaneously operated. In such cases it has been customary in the past to provide a forward draw-bar, which in turn is connected to the rearward draw-bars which are connected to the harrow sections, and a large team of horses is hitched to the central portion of the forward bar. Any such an arrangement possesses the serious disadvantage that a large team of horses, usually four in number, work on the same draw-point, but the main disadvantage is that the entire arrangement of great width includes a very long draw-bar, so that it is impossible to drive the same through a farm gate of ordinary width without entirely disassembling the structure. Furthermore, when this arrangement is used, the several sections cannot be individually operated without considerable re-arrangement. Furthermore, such an arrangement as the foregoing possesses the additional disadvantage that the individual harrow sections are to a large extent inter-dependent in their various movements and adjustments as they travel over the field, so that they cannot perfectly accommodate themselves to the varying contour of a considerable width or strip of ground.

The main object of the present invention is to provide means for joining together two or more independent groups of harrow sections so that when so joined they will of necessity operate as a single unit, to the extent that they will maintain their proper relative positions along the width of a strip of ground; nevertheless, to so join them that they will be free to move independently of each other to the extent necessary to permit them to individually adjust themselves to varying conditions in the contour of the land and to compensate for the momentary variations in draw-pull exerted by the individual teams which draw them; also to provide such a connection between the harrow sections that they can be immediately disconnected from each other and used or operated as independent sections of the usual width. This will permit the several sections to be independently operated in some portions of the field and will also enable the farmer to drive the sections independently through a farm gate, after which they may be again joined together if so desired.

Other objects and uses will appear from a detailed description of the invention, which consists in the features of construction and combinations of parts hereinafter described and claimed.

In the drawing: Figure 1 shows in plan view a pair of harrow units joined together to produce a structure of double width in accordance with the disclosures of the present invention, the individual harrow frames being illustrated diagrammatically by rectangular frames; Fig. 2 shows in perspective an enlarged detail view of the connection between the two units; and Fig. 3 shows a view similar to that of Fig. 2, with the exception that one of the draw-bars has advanced beyond the other, such as would be the case upon the application of an unusually large pull on said draw-bar.

In the drawing I have illustrated two groups of harrow sections, A and B. Each of these groups includes two harrow frames 4, which are flexibly connected to their respective draw-bars 5 and 6 in the usual and well-known manner. The double-trees 7 are connected to the draw-bars 5 and 6 so that each of said draw-bars can be drawn over the field by a team of horses. The units A and B may be considered as drag harrows of usual and well-known construction, and their details need not be further described. In order to join these units together, I provide a connection such that the units are maintained a constant distance apart, while at the same time permitting them to turn or swing freely with respect to each other and also permitting them to individually adjust themselves back and forth the desired amount. In the particular construction illustrated in detail in Figs. 2 and 3, one of the draw-bars 5 is provided with a pair of straps 8 and 9 on its front and rear faces, said straps being preferably bent outward away from each other so as to provide an additional clearance between their end portions 10. The amount of the clearance between these end portions determines or limits the amount of back and forth movement which the harrows may have with respect to each other. The other draw-bar 6 is provided with a pair of straps 11 and 12 on its front and rear faces, and the end portions 13 of said straps are brought together substantially as illustrated. A pin 14 of any desired form is run through the end portions 10 of the straps 8 and 9 and may be held in position as by means of a cotter pin 15. The hole 16 in the end portions 13, through which passes the pin 14, is of such size as to allow some play at that point, so that the two harrow sections can readily turn with respect to each other and so that the back and forth movement will readily occur.

When it is desired to disconnect the sections it is only necessary to remove the pin 14, which in the present case can be done after drawing the cotter pin. Thereupon the two harrow units are independent of each other for all purposes. If desired, additional units can be joined together end to end in this manner, so that three or more units can be brought together to provide an evener of any desired over-all dimensions. The advantages of this arrangement will readily manifest themselves. In addition to those already mentioned in the form of permitting the sections to be readily connected or disconnected and of permitting the desired amount of back and forth play between the sections, it will be observed that a corner can be readily turned, because one of the teams can be brought substantially to rest while the other team drives around. In this way a very sharp turn can be effected. Furthermore, the many objections to the use of an extremely long draw-bar are done away with—such, for example, as cost of procuring stock for and manufacturing the same, and liability to breakage in service.

I claim:

1. In a harrow evener, the combination of a plurality of harrow units, each unit having its individual draw-bar, a pair of diverging straps secured to one end of one of the draw-bars, a pair of converging straps secured to the adjacent end of the other draw-bar, and a removable pin extended through the diverging straps and through the converging straps to permit the converging straps to travel back and forth on said pin between the diverging straps.

2. In a harrow evener the combination of a pair of harrow units, a rigid draw bar in the forward portion of each of said units, draft means connected to each of said draw bars independently of the other draw bar, and means joining together the adjacent ends of the draw bars to space the same while permitting relative backward and forward movement of one draw bar with respect to the other.

3. In a harrow evener the combination of a pair of harrow units, a rigid draw bar in the forward portion of each of said units, draft means connected to each of said draw bars independently of the other draw bar, and a single connection between the adjacent ends of the draw bars, said connection spacing said ends a desired distance apart while permitting relative backward and forward movement of each draw bar with respect to the other.

ALONZO R. KEELER.

Witnesses:
J. M. McKIE,
G. N. LARSON.

Copies of this patent may be obtained for five cents each, by addressing the "Commissioner of Patents, Washington, D. C."